(12) United States Patent
Zheng et al.

(10) Patent No.: US 12,253,746 B2
(45) Date of Patent: Mar. 18, 2025

(54) SMALL INTEGRATED FREE SPACE CIRCULATOR

(71) Applicant: II-VI Delaware, Inc., Wilmington, DE (US)

(72) Inventors: Xi Zheng, Fujian (CN); Guanglong Yu, Fujian (CN); Xu Jia, Fujian (CN); Haifeng Chen, Fujian (CN); Ce Ren, Fujian (CN)

(73) Assignee: II-VI DELAWARE, INC., Wilmington, DE (US)

( * ) Notice: Subject to any disclaimer, the term of this patent is extended or adjusted under 35 U.S.C. 154(b) by 881 days.

(21) Appl. No.: 17/309,585

(22) PCT Filed: Dec. 29, 2018

(86) PCT No.: PCT/CN2018/125805
§ 371 (c)(1),
(2) Date: Dec. 14, 2021

(87) PCT Pub. No.: WO2020/113743
PCT Pub. Date: Jun. 11, 2020

(65) Prior Publication Data
US 2022/0121045 A1    Apr. 21, 2022

(30) Foreign Application Priority Data
Dec. 7, 2018  (CN) .......................... 201811497452.X

(51) Int. Cl.
*G02F 1/09*       (2006.01)
(52) U.S. Cl.
CPC .................. *G02F 1/093* (2013.01)
(58) Field of Classification Search
CPC . G02F 1/093; G02F 1/09; G02F 1/095; G02F 1/0955; G02B 6/2746; G02B 27/283; G02B 6/2706; G02B 6/27
See application file for complete search history.

(56) References Cited

U.S. PATENT DOCUMENTS 6,757,451 B2   6/2004  Chang et al.
7,039,278 B1 *  5/2006  Huang .................... G02F 1/093
                                                                  385/11
(Continued)

FOREIGN PATENT DOCUMENTS

CN    102998746 A    3/2013
CN    104950407 A    9/2015
(Continued)

OTHER PUBLICATIONS

International Search Report and Written Opinion issued in PCT/CN2018/125805 on Aug. 27, 2019.

*Primary Examiner* — Darryl J Collins
*Assistant Examiner* — Matthew Y Lee
(74) *Attorney, Agent, or Firm* — Blank Rome LLP

(57) ABSTRACT

A small integrated free space circulator, comprising a first polarizing beam splitter (1), a half-wave plate (2), a Faraday rotating plate (3), a beam splitter (4), a quarter-wave plate (5), and a pair of reflective plates (6, 7), wherein the first polarizing beam splitter (1), the half-wave plate (2), the Faraday rotating plate (3), and the beam splitter (4) are sequentially arranged, the quarter-wave plate (5) and the reflective plate (6) are sequentially attached to a side surface of the first polarizing beam splitter (1) adjacent to the half-wave plate (2), and the reflective plate (7) is arranged on a side surface of the beam splitter (4, 8) adjacent to or opposite to the Faraday rotating plate (3); when the reflective plate (7) is arranged on the side surface of the beam splitter (8) opposite to the Faraday rotating plate (3), the reflective plate (7) partially covers the side surface of the beam splitter (8) opposite to the Faraday rotating plate (3). By means of an organic combination of optical elements such as the polarizing beam splitters (1, 4), the wave plates (2, 5), the Faraday rotating plate (3), the reflectors (6, 7), and the birefringent crystal (8), the device has advantages such (Continued)

as small volume, high integration, easy production, and low cost, and has a good market prospect.

10 Claims, 3 Drawing Sheets

(56) References Cited

U.S. PATENT DOCUMENTS

| | | | | |
|---|---|---|---|---|
| 2002/0097946 A1* | 7/2002 | Fujita | ............ | G02F 1/0955 |
| | | | | 385/11 |
| 2002/0186914 A1* | 12/2002 | Li | ............ | G02B 6/272 |
| | | | | 385/11 |
| 2003/0072006 A1* | 4/2003 | Gu | ............ | G02B 6/272 |
| | | | | 356/491 |
| 2004/0086214 A1* | 5/2004 | Huang | ............ | G02F 1/093 |
| | | | | 385/11 |
| 2005/0018967 A1* | 1/2005 | Huang | ............ | G02F 1/093 |
| | | | | 385/39 |
| 2016/0274305 A1* | 9/2016 | Ye | ............ | H04B 10/503 |
| 2018/0284350 A1* | 10/2018 | Ayliffe | ............ | G02B 6/4213 |
| 2020/0319389 A1* | 10/2020 | Yun | ............ | G02B 27/283 |

FOREIGN PATENT DOCUMENTS

| | | |
|---|---|---|
| CN | 207051530 U | 2/2018 |
| CN | 108205173 A | 6/2018 |
| CN | 208092376 U | 11/2018 |

* cited by examiner

SMALL INTEGRATED FREE SPACE CIRCULATOR

This application is a national stage of International Patent Application No. PCT/CN2018/125805, filed Dec. 29, 2018, which claims priority to Chinese Application No. 201811497452.X filed Dec. 7, 2018, the entire contents of which are hereby incorporated by reference herein.

TECHNICAL FIELD

The present invention relates to the field of optical devices, and in particular, to a small integrated free space circulator.

BACKGROUND 5G is the core technology for next generation communications. To build a 5G system, a bearer network must be built first, while fronthaul is a major part of the bearer network. In the bearer network, the fronthaul portion occupies the most optical fiber resources. To reduce the optical fiber cost, therefore, the consensus in the industry is to adopt the Bidirectional (BIDI) technology, and a Free-Space Circulator (FSC) is the core device in this technology. In addition, as a general-purpose optical element, the circulator is used extensively, such as EDFA, FBG, etc., and the 5G BIDI application is only one of the typical and popular applications thereof. Therefore, to optimize circulators to be smaller, highly integrated, and of low cost has been the direction and goal of the industry's endeavor.

SUMMARY OF THE INVENTION

The object of the present invention is to provide a small integrated free space circulator with reliable implementations, low cost, easy production, high integration, and small volume.

To achieve the above-described technical object, the present invention adopts the following technical solution.

A small integrated free space circulator comprises a first polarizing beam splitter, a half-wave plate, a Faraday rotating plate, a beam splitter, a quarter-wave plate, and a pair of reflective plates, wherein the first polarizing beam splitter, the half-wave plate, the Faraday rotating plate, and the beam splitter are sequentially arranged, the quarter-wave plate and one of the reflective plates are sequentially attached to a side surface of the first polarizing beam splitter adjacent to the half-wave plate, and the other reflective plate is arranged on a side surface of the beam splitter adjacent to or opposite to the Faraday rotating plate; when the reflective plate is arranged on the side surface of the beam splitter opposite to the Faraday rotating plate, the reflective plate partially covers the side surface of the beam splitter opposite to the Faraday rotating plate; and a polarizing splitting film is provided in the first polarizing beam splitter;

when a signal light is input through an end surface of the first polarizing beam splitter that is away from the half-wave plate, the signal light is split by the polarizing splitting film into a P light and an S light, wherein the P light passes through the polarizing splitting film, then sequentially passes through the half-wave plate and the Faraday rotating plate, and then becomes the S light, which subsequently enters the beam splitter, is guided to the reflective plate, is reflected by the reflective plate back along the original path, then sequentially passes through the Faraday rotating plate and the half-wave plate, enters the first polarizing beam splitter, is reflected by the polarizing splitting film, and is output along a side of the first polarizing beam splitter that is away from the quarter-wave plate; after being reflected by the polarizing splitting film to the side where the quarter-wave plate is arranged and passing through the quarter-wave plate, the S light is reflected by the reflective plate back along the original path, and since the S light has passed through the quarter-wave plate twice, the polarization state of the S light changes and the S light becomes the P light, which subsequently passes through the polarizing splitting film and is output along the side of the first polarizing beam splitter that is away from the quarter-wave plate; and when the signal light is input through a side of the beam splitter that is away from the Faraday rotating plate, the P light is guided by the beam splitter to sequentially pass through the Faraday rotating plate and the half-wave plate, then enters the first polarizing beam splitter, and then passes through the polarizing splitting film and is output from a side surface of the first polarizing beam splitter that is away from the half-wave plate.

Furthermore, the beam splitter is a birefringent crystal, and the other reflective plate is arranged on a side surface of the beam splitter opposite to the Faraday rotating plate and partially covers the side surface.

Furthermore, the beam splitter is a second polarizing beam splitter.

Preferably, the first polarizing beam splitter and the second polarizing beam splitter both comprise a pair of right-angled prisms, the inclined surfaces of the right-angled prisms are attached and fixed together, the attached and fixed inclined surfaces are provided with the polarizing splitting films thereon, and the polarizing splitting films on the first polarizing beam splitter and the second polarizing beam splitter are parallel to each other.

Furthermore, the optical axis of the half-wave plate forms an angle of 22.5 degrees with the Faraday rotating plate.

Furthermore, the Faraday rotating plate is a magnetic Faraday rotating crystal plate or a Faraday rotating crystal plate with an externally applied magnetic field. In the case of a Faraday rotating crystal plate with an externally applied magnetic field, the peripheral side of the Faraday rotating plate is provided with a magnetic ring.

Furthermore, a side surface of the beam splitter adjacent to the Faraday rotating plate is further provided with a receiver, and the receiver is configured to receive a reflected light generated by the signal light input by the beam splitter.

Furthermore, the incident surfaces of the first polarizing beam splitter and the beam splitter are further provided with a wedge to set the incident surfaces to an inclined surface structure.

Furthermore, the first polarizing beam splitter, the half-wave plate, the Faraday rotating plate, the beam splitter, the quarter-wave plate, and the pair of reflective plates are integrally fixed by means of optical bonding, diffusion bonding, or glue bonding.

An optical device comprises the above-described small integrated free space circulator.

By adopting the above-described technical solution, the present invention achieves the following advantageous effects: by means of an organic combination of optical elements such as polarizing beam splitters, wave plates, the Faraday rotating plate, reflectors, and birefringent crystals, the technical solution of the present invention proposes a series of structures of small free space circulators. This device has advantages such as small volume, high integration, easy production, and low cost, and has a good market prospect.

BRIEF DESCRIPTION OF THE DRAWINGS

The solution of the present invention will be further described below in combination with the accompanying drawings and specific embodiments.

DETAILED DESCRIPTION

Embodiment 1

Figure 1:
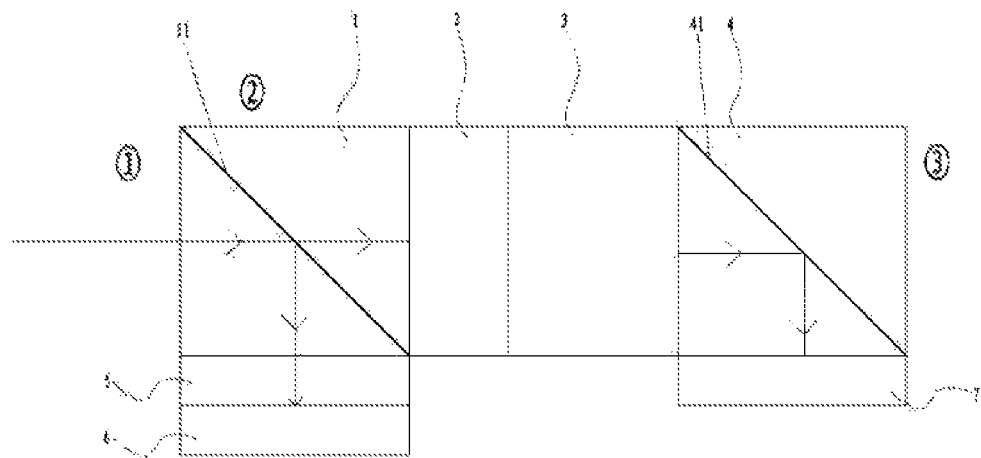
FIG. 1 is a schematic diagram of a simple implementation structure and a light path of Embodiment 1 of the solution of the present invention, wherein the light path is a schematic diagram of a forward light path of a signal light input through a port 1.
Figure 2:
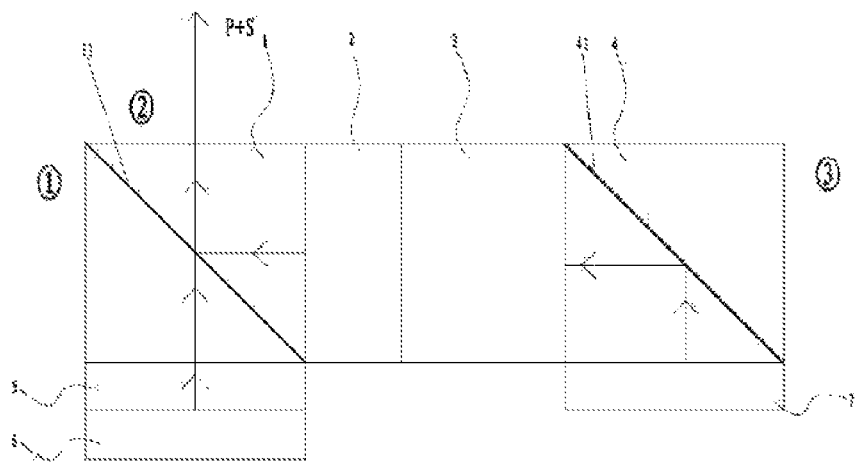
FIG. 2 is a schematic diagram of a simple implementation structure and a light path of Embodiment 1 of the solution of the present invention, wherein the light path is a schematic diagram of a reflected light path of the signal light input through the port 1.
Figure 3:
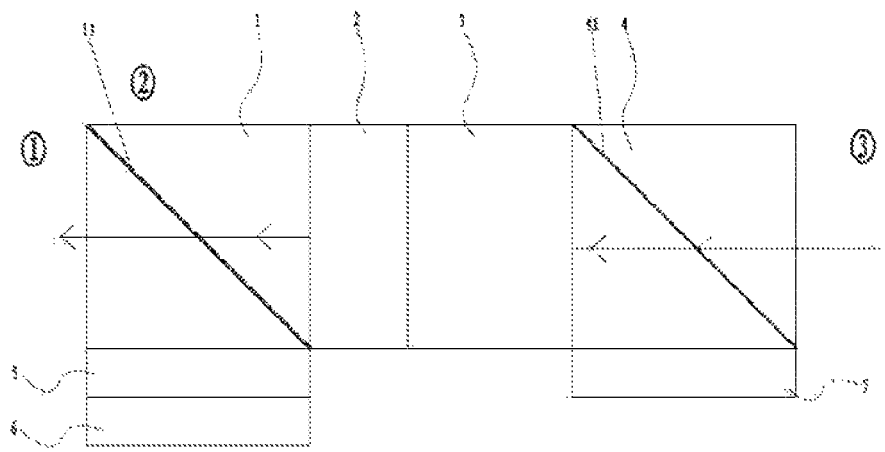
FIG. 3 is a schematic diagram of a simple implementation structure and a light path of Embodiment 1 of the solution of the present invention, wherein the light path is a schematic diagram of a signal light input through a port 3.

As shown in one of FIGS. 1 to 3, the present invention comprises a first polarizing beam splitter 1, a half-wave plate 2, a Faraday rotating plate 3, a second polarizing beam splitter 4, a quarter-wave plate 5, and a pair of reflective plates 6, 7, wherein the first polarizing beam splitter 1, the half-wave plate 2, the Faraday rotating plate 3, and the second polarizing beam splitter 4 are sequentially arranged, the quarter-wave plate 5 and the reflective plate 6 are sequentially attached to a side surface of the first polarizing beam splitter 1 adjacent to the half-wave plate 2, and the reflective plate 7 is arranged on a side surface of the second polarizing beam splitter 4 adjacent to the Faraday rotating plate 3; the first polarizing beam splitter 1 and the second polarizing beam splitter 4 are provided with polarizing splitting films 11, 41 therein; preferably, the first polarizing beam splitter 1 and the second polarizing beam splitter 4 both comprise a pair of right-angled prisms, the inclined surfaces of the right-angled prisms are attached and fixed together, the attached and fixed inclined surfaces are provided with the polarizing splitting films 11, 41 thereon, the polarizing splitting films on the first polarizing beam splitter 1 and the second polarizing beam splitter 4 are parallel to each other, a port 1 is formed on the end surface of the first polarizing beam splitter 1 opposite to the half-wave plate 2, a port 2 is formed on the end surface thereof adjacent to the half-wave plate and opposite to the quarter-wave plate 5, and a port 3 is formed on the end surface of the second polarizing beam splitter 4 opposite to the Faraday rotating plate 3.

Furthermore, the optical axis of the half-wave plate 2 forms an angle of 22.5 degrees with the Faraday rotating plate 3. The Faraday rotating plate 3 may be a magnetic Faraday rotating crystal plate or a Faraday rotating crystal plate with an externally applied magnetic field. In the case of a Faraday rotating crystal plate with an externally applied magnetic field, the peripheral side of the Faraday rotating plate is provided with a magnetic ring.

In addition, the first polarizing beam splitter 1, the half-wave plate 2, the Faraday rotating plate 3, the second polarizing beam splitter 4, the quarter-wave plate 5, and the pair of reflective plates 6, 7 are integrally fixed by means of optical bonding, diffusion bonding, or glue bonding.

Focusing on FIG. 1 and FIG. 2, which are respectively schematic diagrams of a forward light path and a reflected light path of a signal light input through a port 1, and when the signal light is input through an end surface of the first polarizing beam splitter 1 that is away from the half-wave plate 2 (i.e., the port 1), the signal light is split by the polarizing splitting film 11 into a P light and an S light, wherein the P light passes through the polarizing splitting film 11, then sequentially passes through the half-wave plate 2 and the Faraday rotating plate 3, and then becomes the S light as its polarization state changes as a result of the nonreciprocal characteristic of the Faraday rotating plate 3; the S light subsequently enters the second polarizing beam splitter 4, is guided to the reflective plate 7 and is reflected by the reflective plate 7 back along the original path, then sequentially passes through the Faraday rotating plate 3 and the half-wave plate 2, enters the first polarizing beam splitter 1, is reflected by the polarizing splitting film 11, and is output along the side of the first polarizing beam splitter 1 that is away from the quarter-wave plate 5 (i.e., the port 2); after being reflected by the polarizing splitting film 11 to the side where the quarter-wave plate 5 is arranged and passing through the quarter-wave plate 5, the S light is reflected by the reflective plate 6 back along the original path, and since the S light has passed through the quarter-wave plate 5 twice, the polarization state of the S light changes and the S light becomes the P light, which subsequently passes through the polarizing splitting film 11 and is output along the side of the first polarizing beam splitter 1 that is away from the quarter-wave plate 5 (i.e., output from the port 2).

Focusing on FIG. 3, which is a schematic diagram of a light path of a signal light input through a port 3, and when the signal light is input through a side of the second polarizing beam splitter 4 that is away from the Faraday rotating plate 3 and forms a P light, the P light is guided by the second polarizing beam splitter 4 to sequentially pass through the Faraday rotating plate 3 and the half-wave plate 2 (due to the nonreciprocal characteristic of the Faraday rotating plate, the polarization state of the signal light in a direction from the port 3 to the port 1 does not change), then enters the first polarizing beam splitter 1, and then passes through the polarizing splitting film 11 and is output from a side surface of the first polarizing beam splitter 1 that is away from the half-wave plate 2 (i.e., output from the port 1).

In summary, the optical fiber arranged at the port 1 has the functions of transmitting and receiving, that is, bidirectional (BIDI).

The method for processing and manufacturing the structure in the present embodiment is briefly described as follows:

1. manufacturing of the polarizing beam splitter (PBS) component: the component may be manufactured using a conventional optical cold processing plus coating, and the processing methods include, but are not limited to, glue bonding, optical bonding, and diffusion bonding. The PBS processing methods are relatively classic and will not be elaborated again herein;
2. the wave plate component: this structure uses half-wave plates and ¼-wave plates, the optical axis thereof forms an angle of 22.5 degrees with the Faraday rotating plate, and the wave plate processing is mainly to control the thickness and optical axis direction thereof;
3. the rotating component: a 45-degree Faraday rotating plate is used as the rotating component, including a magnetic type and a non-magnetic type (if the non-magnetic type is used, an additional small magnetic ring needs to be added), and a film needs to be coated on the glue of the Faraday rotating plate, so as to ensure good IL;
4. the reflector component: the reflector component is relatively simple, which simply requires the coating of a reflective film with a corresponding wave hand on a piece of flat glass; and
5. the several components listed above are attached together by means of glue bonding, optical bonding, or diffusion bonding to form a small free space circulator, which achieves transmitting and receiving functions in the vertical direction, has a smaller size, and realizes a more compact structure.

Embodiment 2

Figure 4:
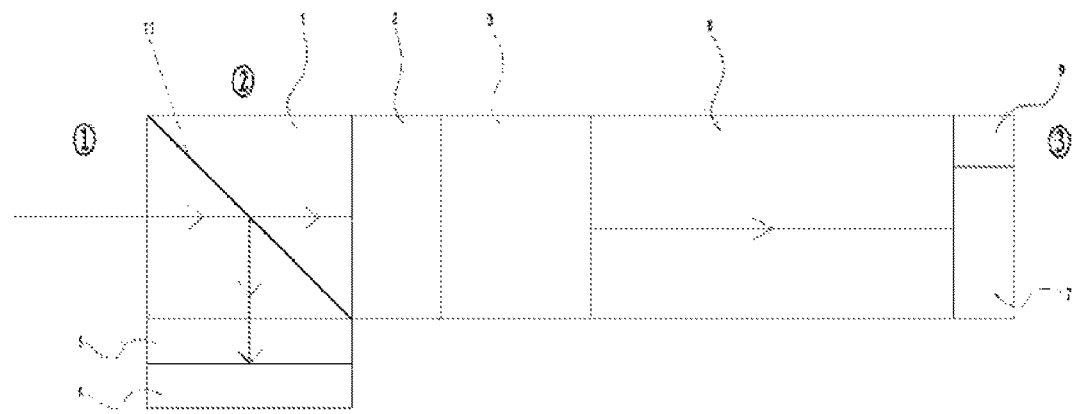
FIG. 4 is a schematic diagram of a simple implementation structure and a light path of Embodiment 2 of the solution of the present invention, wherein the light path is a schematic diagram of a forward light path of a signal light input through a port 1.
Figure 5:
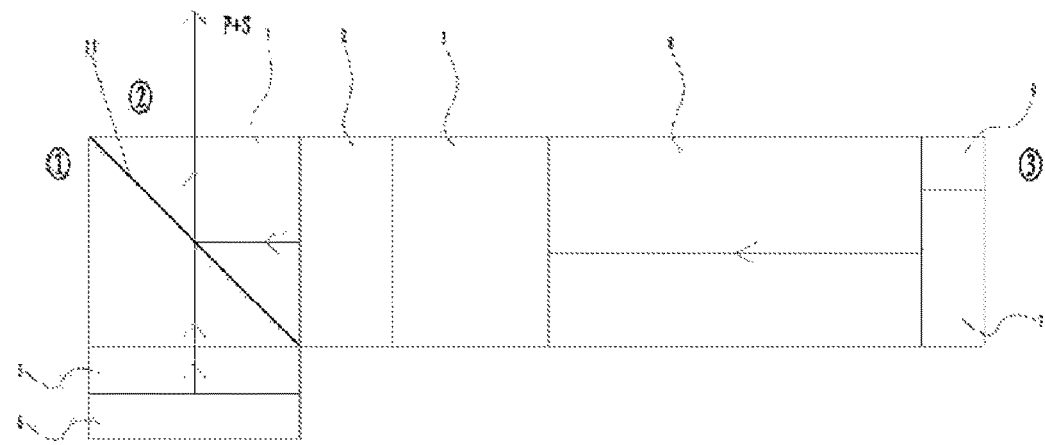
FIG. 5 is a schematic diagram of a simple implementation structure and a light path of Embodiment 2 of the solution of the present invention, wherein the light path is a schematic diagram of a reflected light path of the signal light input through the port 1.
Figure 6:
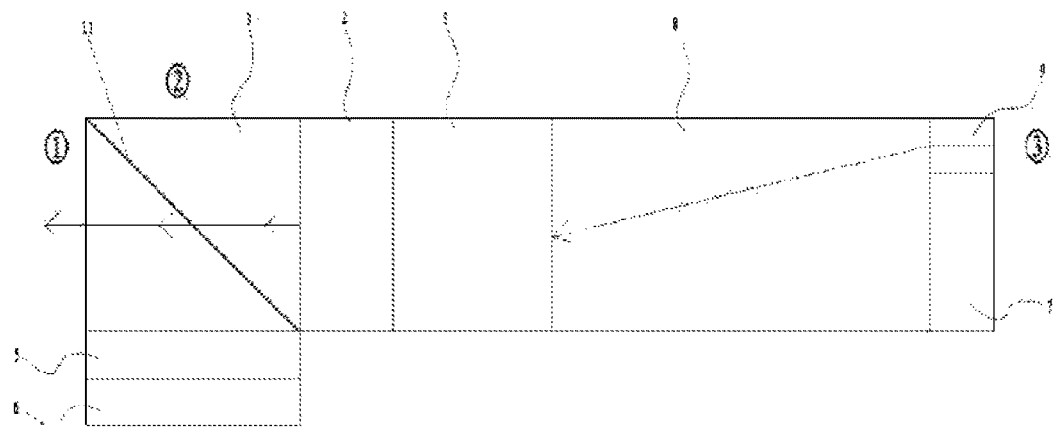
FIG. 6 is a schematic diagram of a simple implementation structure and a light path of Embodiment 2 of the solution of the present invention, wherein the light path is a schematic diagram of a signal light input through a port 3.

Referring to FIGS. 4 to 6, the present embodiment is substantially the same as Embodiment 1 and differs in that the beam splitter is a birefringent crystal 8, and the reflective plate 7 is arranged on a side surface of the birefringent crystal 8 opposite to the Faraday rotating plate 3. Moreover, the reflective plate 7 partially covers the side surface of the birefringent crystal 8 opposite to the Faraday rotating plate 3, the uncovered portion forms a port 3 for inputting a signal light, and the portion uncovered by the reflective plate may be provided with an optical lens or polarizing beam splitter 9 for guiding the P light in the signal light to be input into the birefringent crystal 8. The structure of the present embodiment can similarly realize the functions of a BIDI free space circulator.

Focusing on FIG. 4 and FIG. 5, which are respectively schematic diagrams of a forward light path and a reflected light path of a signal light input through a port 1, the signal light is input through the port 1 and split by the polarizing splitting film 11 of the first polarizing beam splitter 1 into an S light and a P light, wherein the P light passes through the polarizing splitting film, and then becomes the S light after passing through a rotating assembly consisting of the half-wave plate 2 and the Faraday rotating plate 3, wherein the S light is an O light in the birefringent crystal 8 with no birefringent phenomenon and no deviation of the light path. The light is incident perpendicularly onto the reflector 7 arranged at the rightmost side of the birefringent crystal 8, and then returns along the original path. After the returned light passes through the rotating assembly that is nonreciprocal, its polarization state does not change, and it is still the S light, which returns into the first polarizing beam splitter 1, is reflected by the polarizing splitting film 11, and is then output from the port 2. On the other hand, the other light, that is, the S light input through the port 1 and reflected by the polarizing splitting film 11, is reflected to the side where the quarter-wave plate 5 is arranged and passes through the quarter-wave plate 5, and then is reflected by the reflective plate 6 back along the original path. Since the S light has passed through the quarter-wave plate 5 twice, the polarization state of the S light changes and the S light becomes the P light, which subsequently passes through the polarizing splitting film 11 and is output along the side of the first polarizing beam splitter 1 that is away from the quarter-wave plate 5 (i.e., output from the port 2), and forms a P+S combined light with the above-described returned S light.

Focusing on FIG. 6, which is a schematic diagram of a light path of a signal light input through a port 3, and when the signal light is input through the port 3 to form P light which goes into the birefringent crystal 8, the light enters the previous original position after the walk-off effect by the birefringent crystal 8 (the P light is an E light in the birefringent crystal, and the light path will deviate). Since the Faraday rotating plate 3 is nonreciprocal and due to the transmission of the P light through the polarizing splitting film 11, the P light smoothly passes all the way from the birefringent crystal 8, the Faraday rotating plate 3, and the half-wave plate 2 at the right side of the figure into the first polarizing beam splitter 1 at the left side, and is then output from the port 1 through the polarizing splitting film 11. The light path process from the port 3 to the port 1 is described above, wherein the port 1 is equipped with the receiving and transmitting functions and realizes BIDI.

The method for processing the structure in the present embodiment is briefly described as follows:

1. the polarizing beam splitters, the wave plates, the rotating plate, and the reflectors are all similar to those in Embodiment 1 and will not be elaborated again;
2. the birefringent crystal component: YVO4 (with a relatively high birefringent coefficient) is usually selected, and the birefringent crystal is subject to a conventional optical cold processing method with the optical axis direction and crystal size being key indices, wherein the optical axis needs to be parallel to the paper surface, causing the S light to be an O light and the P light to be an E light, and the crystal needs to have such a size that the walk-off distance thereof can absolutely separate light spots. Specific calculations need to be performed for the above indices according to different applications and scenarios; and
3. the above components are attached together by means of glue bonding, optical bonding, or diffusion bonding to form a small free space circulator, which achieves transmitting and receiving functions in the vertical direction and has a small volume, but is slightly longer, in the length direction, than the structure A due to limitations by the walk-off crystal.

Embodiment 3

Figure 7:
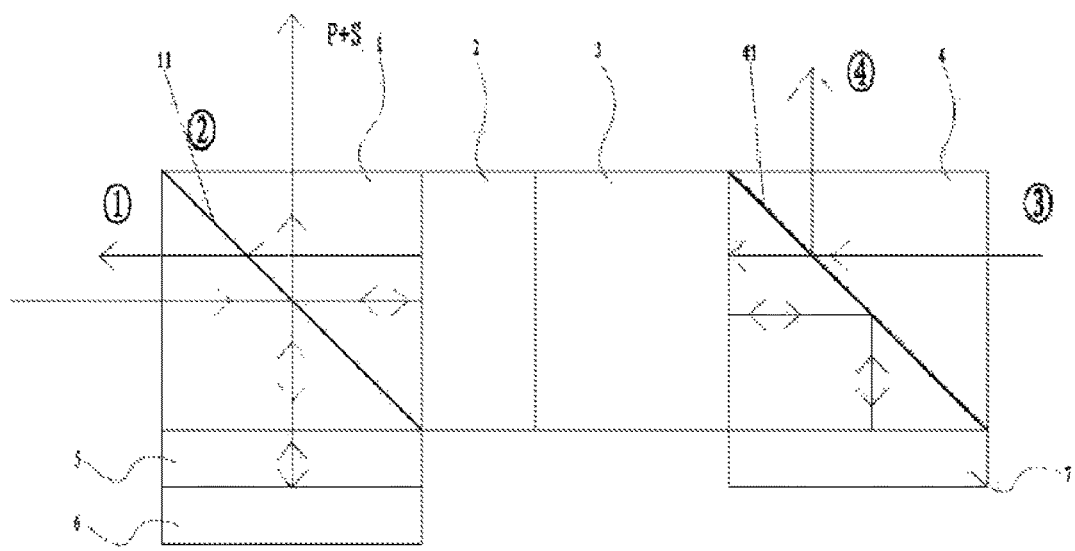
FIG. 7 is a schematic diagram of a simple implementation structure and a light path of Embodiment 3 of the solution of the present invention.

Referring to FIG. 7, the present embodiment has substantially the same structure as that in Embodiment 1 and differs in that one side of an end surface of the second polarizing beam splitter 4 away from the reflective plate 7 is provided with a receiver configured to receive a portion of the P light reflected by the polarizing splitting film 41 (i.e., a port 4 is provided to receive a portion of the signal light input through the port 3 and reflected by the polarizing splitting film 41). Although most of the P light transmits through the polarizing splitting film of the polarizing beam splitter, there is still about 3% of the P light that is reflected. Therefore, this portion of the reflected P light can be used as a monitoring light and received by using the receiver to monitor the power and stability of a laser inputting the signal light through the port 3.

The first polarizing beam splitter 1, the polarizing splitting film 11, the half-wave plate 2, the Faraday rotating plate 3, the second polarizing beam splitter 4, the polarizing splitting film 41, the quarter-wave plate 5, and the reflective plates 6, 7 in the present embodiment are all the same as those in Embodiment 1, and the light paths thereof are also the same. Therefore, they will not be elaborated again.

Embodiment 4

Figure 8:
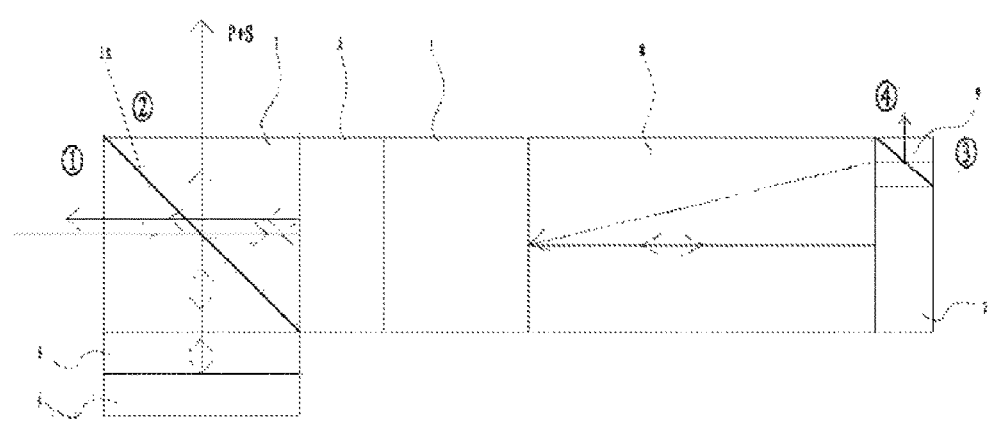
FIG. 8 is a schematic diagram of a simple implementation structure and a light path of Embodiment 4 of the solution of the present invention.

Referring to FIG. 8, the present embodiment has substantially the same structure as that in Embodiment 2 and differs in that one side of an end surface of the input port of the birefringent crystal 8 away from the reflective plate 7 is provided with a receiver configured to receive a portion of the P light reflected by the polarizing beam splitter 9 (i.e., a port 4 is provided to receive a portion of the signal light input through the port 3 and reflected by the polarizing beam splitter 9). Although most of the P light transmits through the polarizing splitting film of the polarizing beam splitter 9, there is still about 3% of the P light that is reflected. Therefore, this portion of the reflected P light can be used as a monitoring light and received by using the receiver to monitor the power and stability of a laser inputting the signal light through the port 3.

The first polarizing beam splitter 1, the polarizing splitting film 11, the half-wave plate 2, the Faraday rotating plate 3, the birefringent crystal 8, the quarter-wave plate 5, and the reflective plates 6, 7 in the present embodiment are all the same as those in Embodiment 2, and the light paths thereof are also the same (wherein the light path of the signal light input through the port 3 is slightly deviated). Therefore, they will not be elaborated again.

Embodiment 5

Figure 9:
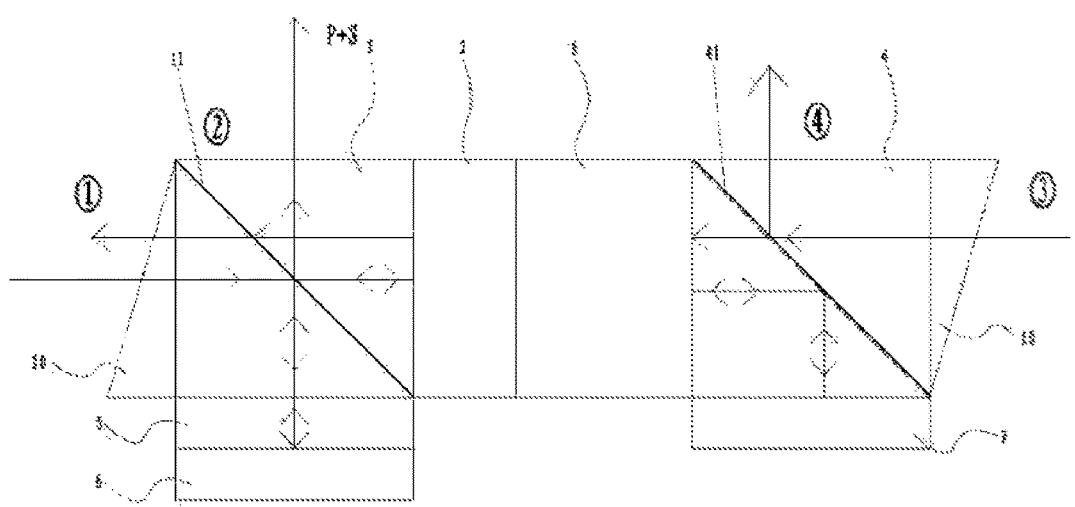
FIG. 9 is a schematic diagram of a simple implementation structure and a light path of Embodiment 5 of the solution of the present invention.

In addition to Insertion Loss (IL) and isolation (ISO), Return Loss (RL) is also a key factor for a free space circulator. The present embodiment provides an extension to the implemented structures in Embodiments 1 through 4, wherein a wedge may be added into the above structures, or the right-angled surface of PBS may be processed into an inclined surface to increase RL. See FIG. 9 for details. FIG. 9 is an extension to the structure in Embodiment 1. The first polarizing beam splitter 1, the polarizing splitting film 11, the half-wave plate 2, the Faraday rotating plate 3, the second polarizing beam splitter 4, the polarizing splitting film 41, the quarter-wave plate 5, and the reflective plates 6, 7 illustrated in this structure are all the same as those in Embodiment 1, and the light paths thereof are also the same. Therefore, they will not be elaborated again.

In summary, with regard to the concept of the solutions of the present invention, Embodiments 1 through 5 respectively propose a general structure of receiving and transmitting in the vertical direction, a structure of receiving and transmitting in the vertical direction and having a birefringent crystal, a structure of receiving and transmitting in the lateral direction, and a series of derived structures with a monitoring PD, as well as corresponding sub-types of structures proposed for improving RL. To those of ordinary skills in the art, any equivalent changes, modifications, substitutions, and variations made according to the teaching of the present invention and following the scope of the patent applied for the present invention without departing from the principle and spirit of the present invention shall fall within the scope of the present invention.

What is claimed is:

1. A small integrated free space circulator, comprising a first polarizing beam splitter, a half-wave plate, a Faraday rotating plate, a beam splitter, a quarter-wave plate, and a pair of reflective plates, wherein the first polarizing beam splitter, the half-wave plate, the Faraday rotating plate, and the beam splitter are sequentially arranged, the quarter-wave plate and one of the reflective plates are sequentially attached to a side surface of the first polarizing beam splitter adjacent to the half-wave plate, and the other reflective plate is arranged on a side surface of the beam splitter opposite to the Faraday rotating plate and partially covering the side surface; when the reflective plate is arranged on the side surface of the beam splitter opposite to the Faraday rotating plate, the reflective plate partially covers the side surface of the beam splitter opposite to the Faraday rotating plate; and a polarizing splitting film is provided in the first polarizing beam splitter;

when a signal light is input through an end surface of the first polarizing beam splitter that is away from the half-wave plate, the signal light is split by the polarizing splitting film into a P light and an S light, wherein the P light passes through the polarizing splitting film, then sequentially passes through the half-wave plate and the Faraday rotating plate, and then becomes the S light, which subsequently enters the beam splitter, is guided to the reflective plate and is reflected by the reflective plate back along the original path, then sequentially passes through the Faraday rotating plate and the half-wave plate, enters the first polarizing beam splitter and is reflected by the polarizing splitting film, and is output along a side of the first polarizing beam splitter that is away from the quarter-wave plate; after being reflected by the polarizing splitting film to the side where the quarter-wave plate is arranged and passing through the quarter-wave plate, the S light is reflected by the reflective plate back along the original path, and since the S light has passed through the quarter-wave plate twice, the polarization state of the S light changes and the S light becomes the P light, which subsequently passes through the polarizing splitting film and is output along the side of the first polarizing beam splitter that is away from the quarter-wave plate; and when the signal light is input through a side of the beam splitter that is away from the Faraday rotating plate, the P light is guided by the beam splitter to sequentially pass through the Faraday rotating plate and the half-wave plate, then enters the first polarizing beam splitter, and then passes through the polarizing splitting film and is output from a side surface of the first polarizing beam splitter that is away from the half-wave plate.

2. The small integrated free space circulator according to claim 1, wherein the beam splitter is a birefringent crystal and the small integrated free space circulator further comprises a first input port optically connected to the first polarizing beam splitter and a second input port optically connected to the birefringent crystal, wherein signal light input through the first input port is offset from signal light input through the second input port.

3. The small integrated free space circulator according to claim 1, characterized in that the beam splitter is a second polarizing beam splitter.

4. The small integrated free space circulator according to claim 3, characterized in that the first polarizing beam splitter and the second polarizing beam splitter both comprise a pair of right-angled prisms, the inclined surfaces of the right-angled prisms are attached and fixed together, the attached and fixed inclined surfaces are provided with the polarizing splitting films, and the polarizing splitting films on the first polarizing beam splitter and the second polarizing beam splitter are parallel to each other.

5. The small integrated free space circulator according to claim 1, characterized in that the optical axis of the half-wave plate forms an angle of 22.5 degrees with the Faraday rotating plate.

6. The small integrated free space circulator according to claim 1, characterized in that the Faraday rotating plate is a magnetic Faraday rotating crystal plate or a Faraday rotating crystal plate with an externally applied magnetic field, and in the case of a Faraday rotating crystal plate with an externally applied magnetic field, the peripheral side of the Faraday rotating plate is provided with a magnetic ring.

7. The small integrated free space circulator according to claim 1, characterized in that a side surface of the beam splitter adjacent to the Faraday rotating plate is further provided with a receiver, and the receiver is configured to receive a reflected light generated by the signal light input by the beam splitter.

8. The small integrated free space circulator according to claim 1, characterized in that the incident surfaces of the first polarizing beam splitter and the beam splitter are further provided with a wedge, or the incident surfaces are set to be an inclined surface structure.

9. The small integrated free space circulator according to claim 1, characterized in that the first polarizing beam splitter, the half-wave plate, the Faraday rotating plate, the beam splitter, the quarter-wave plate, and the pair of reflective plates are integrally fixed by means of optical bonding, diffusion bonding, or glue bonding.

10. An optical device, comprising the small integrated free space circulator according to claim 1.

* * * * *